US007079506B1

(12) United States Patent
Mottonen et al.

(10) Patent No.: US 7,079,506 B1
(45) Date of Patent: Jul. 18, 2006

(54) ENHANCEMENTS TO THE 3-CARRIER COMPACT SOLUTION FOR IS-136HS

(75) Inventors: Pekka Mottonen, Oulu (FI); Kari Jyrkka, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/575,033

(22) Filed: May 19, 2000

Related U.S. Application Data

(60) Provisional application No. 60/136,494, filed on May 28, 1999.

(51) Int. Cl.
*H04Q 7/00* (2006.01)

(52) U.S. Cl. ...................... 370/329; 370/458; 370/503; 370/510; 370/512; 455/434

(58) Field of Classification Search ............... 370/280, 370/329–330, 337, 345, 347, 350, 343, 351, 370/458, 503, 507, 510–512, 328; 455/403, 455/422.1, 435.1, 446, 450, 452.1, 458, 466, 455/426.1, 515, 434, 468
See application file for complete search history.

(56) References Cited

U.S. PATENT DOCUMENTS 5,432,779 A 7/1995 Shimo et al. ................. 370/30
5,732,076 A 3/1998 Ketseoglou et al. ........ 370/347
5,768,276 A * 6/1998 Diachina et al. ............ 370/432
6,545,997 B1 * 4/2003 Bohnke et al. ............ 370/347
6,587,695 B1 * 7/2003 Jyrkka et al. ............... 455/515
6,594,252 B1 * 7/2003 Barany et al. .............. 370/347

OTHER PUBLICATIONS

3-Carrier Compact Proposal, Rejection 1.0, ETSI SMG2 Working Session on EDGE, May 17-19, 1999, Paris, France, Source: UWCC,PP.1-16.*

3-*Carrier Compact Proposal*, Revision 1.0, ETSI SMG2 Working Session on EDGE, May 17-19, 1999, Paris, France, Source: UWCC, PP. 1-16.

* cited by examiner

*Primary Examiner*—Seema S. Rao
*Assistant Examiner*—Inder Pal Mehra
(74) *Attorney, Agent, or Firm*—Harrington & Smith, LLP

(57) ABSTRACT

A method enables the introduction of a 200 kHz GSM-type network into a TDMA system having a bandwidth that is substantially less than a 2.5 MHz bandwidth normally employed for GSM-type networks. The method provides a 52-multiframe containing 12 blocks of four consecutive frames, two idle frames, and two control channels, and rotates the control channels belonging to a serving time group over odd timeslot numbers as 7, 5, 3, 1, 7, 5, . . . , etc. Preferably the rotation occurs between frame numbers (FN) mod 52=3 and 4. Information specifying at least the rotation direction is signalled to the mobile station in a downlink synchronization channel.

17 Claims, 2 Drawing Sheets

| Channel designation | Sub-channel number | Direction | Allowable time-slot assignment | Allowable RF channel assignment | Burst type | Repeat length in TDMA frames | Interleaved block TDMA frame mapping |
|---|---|---|---|---|---|---|---|
| PDTCH, PACCH | | D&U | 0...7 | C0...Cn | NB1 | 52 | B0(0...3), B1(4...7), B2(8...11), B3(13...16), B4(17...20), B5(21..24), B6(26...29), B7(30...33), B8(34...37), B9(39...42), B10(43...46), B11(47...50) |
| PBCCH | | D | 0...7 | C0...Cn | NB | 52 | B0(0... 3), B3(13...16), B6(26...29), B9(39...42) |
| | | | | | | | |
| PRACH | | U | 0...7 | C0...Cn | AB | 52 | B0(0)...B11(11), B12(13)...B23(24), B24(26)... B35(37), B36(39)...B47(50) |
| | | | | | | | |
| PPCH, PNCH | | D | 0...7 | C0...Cn | NB | 52 | B1(4 ... 7), B2(8...11), B3(13...16), B4(17...20), B5(21..24), B6(26...29), B7(30...33), B8(34...37), B9(39...42), B10(43...46), B11(47...50) |
| PAGCH | | D | 0...7 | C0...Cn | NB | 52 | B0(0...3), B1(4 ... 7), B2(8...11), B3(13...16), B4(17...20), B5(21..24), B6(26...29), B7(30...33), B8(34...37), B9(39...42), B10(43...46), B11(47...50) |
| | | | | | | | |
| PTCCH/D | | D | 0...7 | C0...Cn | NB | 416 | B0(12,38,64,90), B1(116,142,168,194), B2(220,246,272,298), B3(324,350,376,402) |
| PTCCH/U | 0<br>1<br>2<br>3<br>4<br>5<br>6<br>7<br>8<br>9<br>10<br>11<br>12<br>13<br>14<br>15 | U | 0...7 | C0...Cn | AB | 416 | B0(12)<br>B0(38)<br>B0(64)<br>B0(90)<br>B0(116)<br>B0(142)<br>B0(168)<br>B0(194)<br>B0(220)<br>B0(246)<br>B0(272)<br>B0(298)<br>B0(324)<br>B0(350)<br>B0(376)<br>B0(402) |

Mapping of logical channels onto physical channels

| Channel designation | Sub-channel number | Direction | Allowable time-slot assignment | Allowable RF channel assignment | Burst type | Repeat length in TDMA frames | Interleaved block TDMA frame mapping |
|---|---|---|---|---|---|---|---|
| PDTCH, PACCH | | D&U | 0...7 | C0...Cn | NB1 | 52 | B0(0...3), B1(4...7), B2(8...11), B3(13...16), B4(17...20), B5(21..24), B6(26...29), B7(30...33), B8(34...37), B9(39...42), B10(43...46), B11(47...50) |
| PBCCH | | D | 0...7 | C0...Cn | NB | 52 | B0(0... 3), B3(13...16), B6(26...29), B9(39...42) |
| | | | | | | | |
| PRACH | | U | 0...7 | C0...Cn | AB | 52 | B0(0)...B11(11), B12(13)...B23(24), B24(26)... B35(37), B36(39)...B47(50) |
| | | | | | | | |
| PPCH, PNCH | | D | 0...7 | C0...Cn | NB | 52 | B1(4 ... 7), B2(8...11), B3(13...16), B4(17...20), B5(21..24), B6(26...29), B7(30...33), B8(34...37), B9(39...42), B10(43...46), B11(47...50) |
| PAGCH | | D | 0...7 | C0...Cn | NB | 52 | B0(0...3), B1(4 ... 7), B2(8...11), B3(13...16), B4(17...20), B5(21..24), B6(26...29), B7(30...33), B8(34...37), B9(39...42), B10(43...46), B11(47...50) |
| | | | | | | | |
| PTCCH/D | | D | 0...7 | C0...Cn | NB | 416 | B0(12,38,64,90), B1(116,142,168,194), B2(220,246,272,298), B3(324,350,376,402) |
| PTCCH/U | 0 | U | 0...7 | C0...Cn | AB | 416 | B0(12) |
| | 1 | | | | | | B0(38) |
| | 2 | | | | | | B0(64) |
| | 3 | | | | | | B0(90) |
| | 4 | | | | | | B0(116) |
| | 5 | | | | | | B0(142) |
| | 6 | | | | | | B0(168) |
| | 7 | | | | | | B0(194) |
| | 8 | | | | | | B0(220) |
| | 9 | | | | | | B0(246) |
| | 10 | | | | | | B0(272) |
| | 11 | | | | | | B0(298) |
| | 12 | | | | | | B0(324) |
| | 13 | | | | | | B0(350) |
| | 14 | | | | | | B0(376) |
| | 15 | | | | | | B0(402) |

FIG. 3 Mapping of logical channels onto physical channels

ENHANCEMENTS TO THE 3-CARRIER COMPACT SOLUTION FOR IS-136HS

CLAIM OF PRIORITY FROM A COPENDING PROVISIONAL PATENT APPLICATION

Priority is herewith claimed under 35 U.S.C. §119(e) from Provisional Patent Application No. 60/136,494, filed May 28, 1999, entitled "ENHANCEMENTS TO THE 3-CARRIER COMPACT SOLUTION FOR IS-136HS", by Kari Jyrkkä and Pekka Möttönen. The disclosure of this Provisional Patent Application is incorporated by reference herein in its entirety.

FIELD OF THE INVENTION

This invention relates generally to wireless communication systems and terminals and, in particular, to the integration of various types of wireless communication networks having differing channel width, spacing and bandwidth requirements. With even greater specificity, the teachings of this invention relate to a narrowband deployment of a Global System for Mobile Communications (GSM)-based network.

BACKGROUND OF THE INVENTION

As an example of a narrowband deployment with a GSM-based network, a proposed standard for IS-136HS integrates 200 kHz GSM-like carriers with the current IS-136 TDMA system, with a 1 MHz initial deployment. General reference to GSM carriers, networks and mobile stations can be had by referring to "The GSM System for Mobile Communications", by Michel Mouly and Marie-Bernadette Pautet, 1992, the disclosure of which is incorporated by reference in its entirety.

One attractive solution would be to use the nearly completed specification, at the time of filing of the Provisional Patent Application, for Enhanced General Packet Radio Services, or EGPRS having 8-PSK modulation plus General Packet Radio Services (GPRS) packet data channels, from GSM/ETSI. This would save a considerable amount of specification work by adapting the work already done for the GSM 200 kHz carrier. However, at least some network operators have expressed a preference to make the initial 200 kHz deployment using a very narrow bandwidth (1 MHz), whereas currently used GSM systems require at least 2.5 MHz bandwidth. This is because each cell in a GSM system must transmit a high power, continuous Broadcast Control Channel (BCCH) signal. A mobile station or terminal (e.g., a GSM cellular telephone) uses the BCCH transmission for synchronization and neighbor cell channel monitoring purposes. In addition, all of the network parameters as well as the paging messages are received from the BCCH carrier.

Those skilled in the art will appreciate that the interference from these continuously transmitted BCCH carriers must be somehow reduced, otherwise the introduction of a 200 kHz network into a 1 MHz bandwidth system is very difficult or technically impossible.

A 3-Carrier Compact Solution was adopted at a UWC-C.GTF.PDFG/RF-group meeting 13-15.5.99 in Monterey (UWCC.GTF.PDFG/99.04.13.38, 3-Carrier Compact Proposal). The 3-Carrier Compact Solution is a proposal for IS-136HS that maintains a spectrum deployment below 1 MHz. The general idea is to use three carriers (600 kHz) in a ⅓ reuse, but to achieve 9 or 12 reuse for control channels by using a 200 kHz synchronous network. The 3-Carrier Compact Solution was presented to ETSI during a Paris EDGE SMG workshop (Tdoc SMG2 EDGE 122/99, Tdoc SMG2 EDGE 152/99, Tdoc SMG2 EDGE 153/99). Reference in this regard can be had to Appendix A of the above-referenced Provisional Patent Application No. 60/136,494, filed May 28, 1999.

In this proposal the control channel is discontinuously transmitted. As a result, the neighbor channel measurements and neighbor cell base station identity (BSIC) decoding become more difficult when the mobile station is in a traffic mode. However, the IS-136HS compact was developed for GPRS traffic only and, therefore, the mobile station neighbor channel measurement and BSIC decoding capabilities were viewed as sufficient for packet-only services.

However, the inventors have analyzed the neighbor channel measurement and neighbor channel BSIC decoding capability of the 3-Carrier Compact Solution. The results of this analysis are presented in Appendix B of the above-referenced Provisional Patent Application No. 60/136,494, filed May 28, 1999, which has been incorporated by reference herein in its entirety. In brief, the analysis shows that the 3-Carrier Compact Solution proposal has serious problems with delay critical services (including both circuit switched and packet switched services) when the mobile station must handle both uplink and downlink transactions during each GSM TDMA frame. In this case there will be only certain neighbor channel measurement and BSIC decoding positions where the mobile station is able to "see" the neighbor cell signal. Therefore, it has been discovered that the mobile station will not be able to measure a sufficient number of neighbor cells, and will not be able to see a neighbor cell BSIC, without dropping some circuit switched traffic bursts. The necessity to drop traffic bursts in order to make neighbor cell channel measurements is obviously an undesirable solution for a number of reasons.

OBJECTS AND ADVANTAGES OF THE INVENTION

It is a first object and advantage of this invention to facilitate the introduction of a 200 kHz GSM-type network into a system having a bandwidth that is substantially less than the 2.5 MHz bandwidth normally employed for GSM-type networks.

It is a second object and advantage of this invention to provide an improved and enhanced 3-Carrier Compact Solution.

SUMMARY OF THE INVENTION

The foregoing and other problems are overcome and the objects and advantages are realized by methods and apparatus in accordance with embodiments of this invention, wherein enhancements are made to the 3-Carrier Compact Solution.

More specifically, the mobile station's capability to see (i.e., receive) neighbor cell signals, when in the traffic mode, is improved by the teachings of this invention. This enhancement makes circuit switched services technically feasible to implement, as the mobile station is enabled to see of all the neighboring channel signals when in the traffic mode. That is, the mobile station can make a sufficient number of measurements from each neighbor channel, and can also decode all neighbor channel BSICs, without dropping traffic bursts.

A method in accordance with this invention thus enables the introduction of a 200 kHz GSM-type network into a TDMA system having a bandwidth that is substantially less than a 2.5 MHz bandwidth normally employed for GSM-type networks. The method has steps of providing a 52-multiframe that contains 12 blocks of four consecutive frames, two idle frames, and two channels used for the Packet Timing advance Control Channel (PTCCH); and rotating the control channels belonging to a serving time group over odd timeslot numbers as 7, 5, 3, 1, 7, 5, . . . , etc. The rotation occurs between frame numbers (FN) mod 52=3 and 4. The packet switched logical channels Packet Data Traffic Channel (PDTCH), Packet Associated Control Channel (PACCH) and PTCCH are preferably not rotated.

The control channel rotation in accordance with this invention makes the mobile station cell reselection measurements possible during the traffic state, even in the case of a discontinuously transmitted control channel. This is because each neighbor cell control channel signal is caused to rotate periodically into the mobile station's neighbor cell measurement window. Traditionally, when the mobile station is involved with traffic it is constrained to receive and transmit bursts in fixed positions, and thus there is a limited neighbor cell measurement window after a transmission burst (TX) and before the next reception period (RX). In the conventional implementation the discontinuously transmitting control channel was at a fixed location, and thus the mobile station was not able to receive signals from all neighbor cells, when involved in traffic, without dropping some traffic.

BRIEF DESCRIPTION OF THE DRAWINGS

The above set forth and other features of the invention are made more apparent in the ensuing Detailed Description of the Invention when read in conjunction with the attached Drawings, wherein:

FIG. 3 shows the mapping of logical channels onto physical channels.

DETAILED DESCRIPTION OF THE INVENTION

Figure 1:
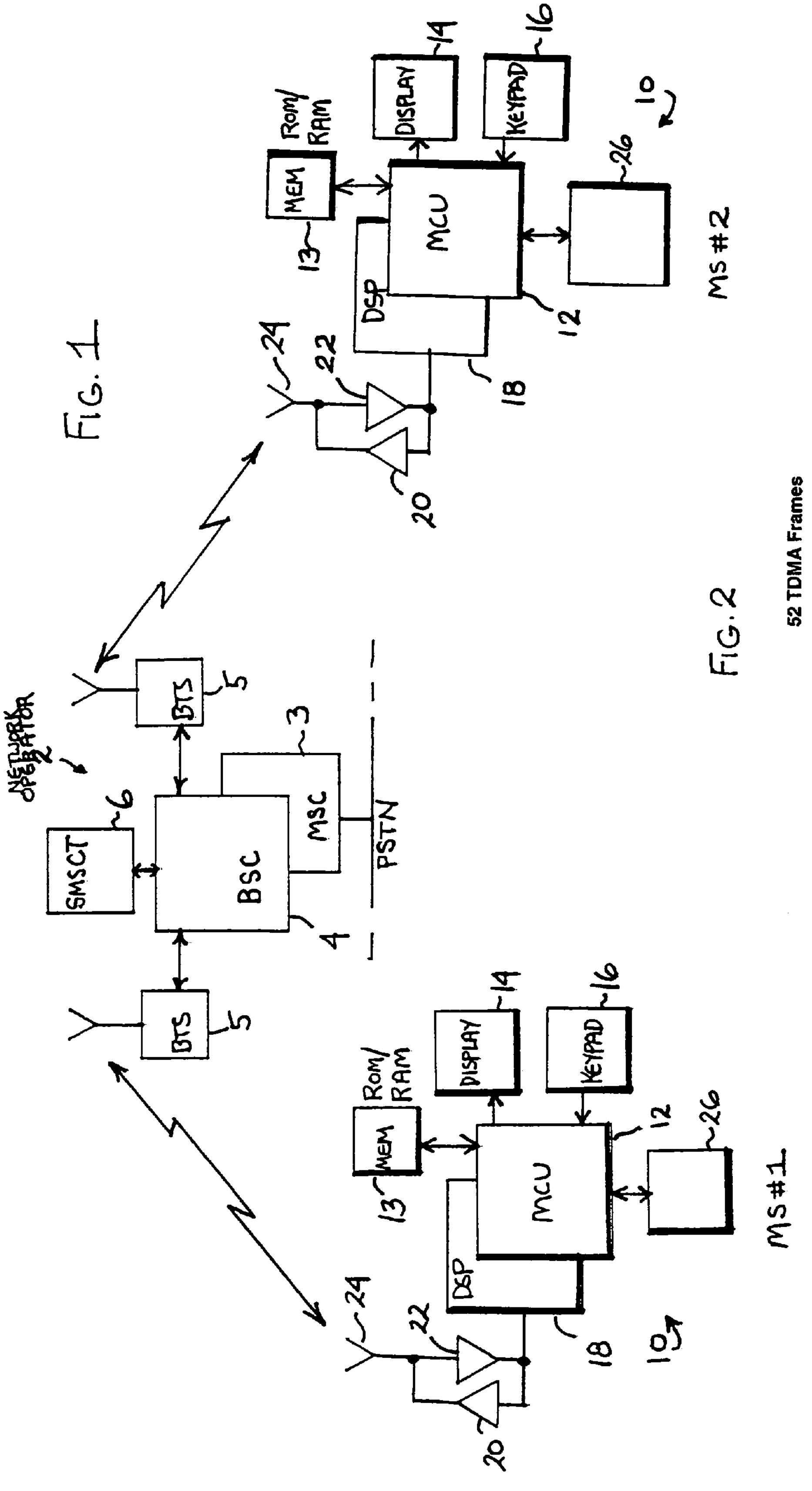
FIG. 1 is a block diagram of a mobile telecommunications system, having packet data capabilities, that is suitable for practicing this invention.

Referring to FIG. 1, there is illustrated a simplified block diagram of an embodiment of an exemplary wireless telecommunications system 1 that includes a plurality of mobile stations 10. Two mobile stations (MSs) are shown in the Figure, with one being designated MS#1 and the other MS#2. FIG. 1 also shows an exemplary network operator 2 having, for example, a mobile switching center (MSC) 3 for connecting to a telecommunications network, such as the Public Switched Telephone Network or PSTN, at least one base station controller (BSC) 4, and a plurality of base transceiver stations (BTS) 5 that transmit in a forward or downlink direction both physical and logical channels to the mobile stations 10 in accordance with a predetermined air interface standard. It is assumed that a reverse or uplink communication path exists from the mobile station 10 to the network operator, which conveys mobile originated access requests and traffic, including packet data traffic in accordance with an aspect of these teachings.

In the presently preferred, but not limiting, embodiment of these teachings, the air interface standard conforms to a Time Division Multiple Access (TDMA) air interface and to the EGPRS protocol.

The network operator 2 can include Message Service Center (MSCT) that receives and forwards messages for the mobile stations 10, such as Short Message Service (SMS) messages, or any wireless messaging technique including e-mail and Supplementary Data Services. Furthermore, enhancements to SMS can be used, such as one under development and known as Multimedia Messaging Service (MMS), wherein image messages, video messages, audio messages, text messages, executables and the like, and combinations thereof, can be transferred between a network and a mobile station.

The mobile station 10 typically includes a microcontrol unit (MCU) 12 having an output coupled to an input of a display 14 and an input coupled to an output of a keyboard or keypad 16. The mobile station 10 may be considered to be a handheld radiotelephone, such as a cellular telephone or a personal communicator, and may have a microphone and a speaker (not shown) for conducting voice communications. The mobile station 10 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 12 is assumed to include or be coupled to some type of a memory 13, including a read-only memory (ROM) for storing an operating program, as well as a random access memory (RAM) for temporarily storing required data, scratchpad memory, received data packets and data packets prepared for transmission, etc. A separate, removable SIM (not shown) can be provided as well, the SIM storing, for example, a preferred Public Land Mobile Network (PLMN) list and other subscriber-related information. The ROM is assumed, for the purposes of this invention, to store a program enabling the MCU 12 to execute the software routines required to operate in accordance with the presently preferred packet data protocols and procedures.

The mobile station 10 also contains a wireless section that includes a digital signal processor (DSP) 18, or equivalent high speed processor, as well as a wireless transceiver comprised of a transmitter 20 and a receiver 22, both of which are coupled to an antenna 24 for communication with the network operator 1.

A description is now given of a presently preferred enhancement to the 3-Carrier Compact Solution in accordance with an aspect of this invention, wherein time groups on each carrier are rotated. For example, a given one of the BTS 5 transmits/receives its control channel on frequency 1 at timeslot 7, and during the next 52-multiframe period the base station shifts its control channel transmission/reception to timeslot 5. This rotation continues multiframe by multiframe as, for this example, 7, 5, 3, 1, 7, 5, 3, 1, 7 . . . , etc. The other three BTSs 5 which are transmitting their control channels on the same frequency 1 are also rotating their control channel positions by one timeslot relative to each other.

Figure 2:
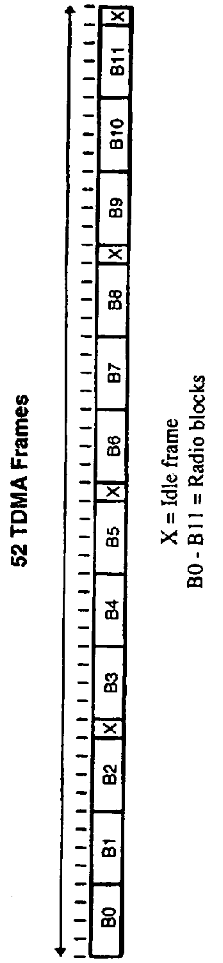
FIG. 2 illustrates the format of radio blocks in a 52 TDMA multiframe.

A method has a first step of providing a 52-multiframe that contains 12 blocks of four consecutive frames, two idle frames, and two channels used for the Packet Timing advance Control Channel (PTCCH), as is shown in FIG. 2. A block allocated to a given logical channel comprises one radio block or, in the uplink direction only, four random access bursts. The type of channel may vary on a block by block basis. FIG. 3 shows the frame numbers for each of the blocks (B0 . . . B11) transmitted in the multiframe. The ordered list of blocks is defined as B0, B6, B3, B9, B1, B7, B4, B10, B2, B8, B5, B11. In the downlink direction, the logical channel type is indicated by the message type contained in the block header.

For the Compact solution of most interest to this invention, timeslot mapping and rotation of control channels is used such that, for a next step of the method, the control channels belonging to a serving time group are rotated over every other timeslot number. In a preferred embodiment of this invention the rotation occurs over odd timeslot numbers. In a most preferred embodiment of this invention the rotation occurs over odd timeslot numbers as 7, 5, 3, 1, 7, 5, . . . , etc. The rotation occurs between frame numbers (FN) mod 52=3 and 4. The packet switched logical channels Packet Data Traffic Channel (PDTCH), Packet Associated Control Channel (PACCH) and PTCCH are preferably not rotated.

The mapping of the control channels on timeslot numbers is defined by the following formula:

$$\text{For } 0 \leq FN \bmod 52 \leq 3,\ TN=((6\times((FN\ div 52) \bmod 4))+1+(2\times TG)) \bmod 8; \text{ and}$$

$$\text{For } 4 \leq FN \bmod 52 \leq 51,\ TN=((6\times((FN\ div 52) \bmod 4))+7+(2\times TG)) \bmod 8.$$

The control channel rotation in accordance with this invention makes the mobile station cell reselection measurements possible during the traffic state, even in the case of a discontinuously transmitted control channel. This is because each neighbor cell control channel signal is caused to rotate periodically into the mobile station's neighbor cell measurement window. Traditionally, when the mobile station is involved with traffic it is constrained to receive and transmit bursts in fixed positions, and thus there is a limited neighbor cell measurement window after a transmission burst (TX) and before the next reception period (RX). In the conventional implementation the discontinuously transmitting control channel was at a fixed location, and thus the mobile station was not able to receive signals from all neighbor cells, when involved in traffic, without dropping traffic.

One benefit from the control channel rotation is that the mobile station can see all the neighbors in its neighbor monitoring window, and is also able to decode all the neighbor BSICs regardless of the slots where the mobile station traffic is located. Therefore, the use of the rotating control channel enables the 3-Carrier Compact Solution to support circuit switched services on four timeslots which are not occupied for control channel usage. Another benefit of the base station control channel rotation is that the mobile station measurement implementation can be more readily performed, since the mobile station now sees all the neighbor base stations in its measurement window. A further benefit is that the network 1 is not required to organize idle periods for the mobile station 10 so that the mobile station would be enabled to perform cell reselection measurements during traffic times. Also, delay critical services (e.g., circuit switched voice over IP) are made possible, since the mobile station is not required to drop traffic to make neighbor cell reselection measurements. The mobile station 10 is also enabled to decode the BSIC from each neighbor cell during traffic, which is essential so that the mobile station is enabled to identify the neighbor cell before making a reselection to that cell.

The Appendix A to this patent application shows examples of the utility of the teachings of this invention. Appendix A is identical to Annex D of a draft document ETSI EN 300 908 V8.3.0 (2000-01), Digital cellular telecommunications system (Phase 2+); Multiplexing and multiple access on the radio path (GSM 05.02 version 8.3.0 Release 1999). The content of this draft document is incorporated by reference herein in its entirety.

In the presently preferred embodiment the Packet Synchronization Channel (PSCH) is used to signal the rotation direction (and current rotation position) of the control channel to the mobile station 10.

More particularly, a Compact Synchronization Channel (CSCH) is arranged to contain two encoded parameters. The first parameter is the Base Transceiver Station 5 identity code (BSIC) which is six bits (before channel coding) having three bits of PLMN color code with a range of 0–7, and three bits of BS color code with range of 0–7, as defined in GSM 03.03. The second parameter is a Reduced TDMA frame number (RFN) which is 19 bits (before channel coding), arranged as follows:

R1 (10 bits) range 0–1023=FN div (51×52);

R2 (6 bits) range 0–50=(FN div 52) mod 51;

TG (2 bits) range 0–3; and 1 reserved bit; where

FN=TDMA Frame Number, as defined in GSM 05.02, subclause 4.3.3;

TG=Time Group as defined in GSM 05.02, subclause 4.3.4.

GSM 04.06 and GSM 04.08 specify the precise bit ordering, GSM 05.03 specifies the channel coding of the above parameters, and GSM 05.10 defines how the TDMA FN can be calculated from R1 and R2. The disclosures of the various GSM documents are incorporated by reference herein in their entireties.

Those skilled in the art may derive other suitable information encoding and signalling techniques when guided by the foregoing teachings.

Thus, while the invention has been particularly shown and described with respect to preferred embodiments thereof, it will be understood by those skilled in the art that changes in form and details may be made therein without departing from the scope and spirit of the invention.

What is claimed is:

1. A method for enabling an introduction of a 200 kHz GSM-type network into a TDMA system having a bandwidth that is substantially less than a 2.5 MHz bandwidth normally employed for GSM-type networks, comprising:

providing a 52-multiframe containing 12 blocks of four consecutive frames, two idle frames, and two channels used for control channel purposes, said frames comprising a plurality of sequentially numbered timeslots; and rotating control channels belonging to a serving time group over non-sequential, alternate timeslot numbers within a frame.

2. The method as in claim 1, wherein the rotation occurs over odd timeslot numbers in a repeating sequence given as 7, 5, 3, 1, 7, 5, . . . , and where the rotation occurs between frame numbers (FN) mod 52=3 and 4.

3. The method as in claim 1, wherein information specifying at least the rotation direction is signalled to the mobile station in a downlink synchronization channel.

4. A method to enable an introduction of a 200 kHz GSM-type network into a TDMA system having a bandwidth that is substantially less than a 2.5 MHz bandwidth normally employed for GSM-type networks, comprising:

providing a 52-multiframe containing 12 blocks of four consecutive frames, two idle frames, and two channels used for control channel purposes, each of said frames comprising a number of timeslots; and rotating control channels belonging to a serving time group over every other timeslot number, wherein a mapping of the control channels on timeslot numbers is defined by the following formula:

$$\text{For } 0 \leqq FN \bmod 52 \leqq 3, TN=((6\times((FN\ div52) \bmod 4))+1+(2\times TG)) \bmod 8; \text{ and}$$

$$\text{For } 4 \leqq FN \bmod 52 \leqq 51, TN=((6\times((FN\ div52) \bmod 4))+7+(2\times TG)) \bmod 8,$$

where TG is a time group value.

5. A wireless TDMA digital communications system, comprising:

at least one mobile station; and a plurality of base transceiver stations individual ones of which are capable of transmitting packet data to, and receiving packet data from, said mobile station using a 52-multiframe, said frames comprising a plurality of sequentially numbered timeslots, wherein individual ones of said base transceiver stations rotate the transmission of control channels belonging to a serving time group over non-sequential, alternate timeslot numbers within a frame for enabling said mobile station to perform reselection measurements on neighboring base transceiver stations.

6. The system as in claim 5, wherein the rotation occurs between frame numbers (FN) mod 52=3 and 4.

7. The system as in claim 5, wherein information specifying at least the rotation direction is signalled to the mobile station in a downlink synchronization channel.

8. The system as in claim 5, wherein the rotation of the control channels occurs in odd timeslot numbers in a repeating sequence given as 7, 5, 3, 1, 7, 5, . . . , .

9. A wireless TDMA digital communications system, comprising:

at least one mobile station; and a plurality of base transceiver stations individual ones of which are capable of transmitting packet data to, and receiving packet data from, said mobile station using a 52-multiframe, said frames comprising a number of timeslots, wherein individual ones of said base transceiver stations rotate the transmission of control channels belonging to a serving time group over every other timeslot number for enabling said mobile station to perform reselection measurements on neighboring base transceiver stations without dropping traffic, wherein a mapping of the control channels on timeslot numbers is defined by the following formula:

$$\text{For } 0 \leqq FN \bmod 52 \leqq 3, TN=((6\times((FN\ div52) \bmod 4))+1+(2\times TG)) \bmod 8; \text{ and}$$

$$\text{For } 4 \leqq FN \bmod 52 \leqq 51, TN=((6\times((FN\ div52) \bmod 4))+7+(2\times TG)) \bmod 8,$$

where TG is a time group value.

10. A network component of a wireless TDMA communications system, comprising circuitry to transmit information to a mobile station using a 52-multiframe, where frames comprise a plurality of sequentially numbered timeslots, said circuitry operating to rotate the transmission of a control channel belonging to a serving time group over odd timeslot numbers in a repeating sequence given as 7, 5, 3, 1, 7, 5, . . . , where the rotation occurs within a frame between two predetermined frame numbers (FNs).

11. The network component of claim 10, where the rotation occurs between FNs mod 52=3 and 4.

12. A network component of a wireless TDMA communications system, comprising circuitry to transmit information to a mobile station using a 52-multiframe, where frames comprise a plurality of sequentially numbered timeslots, said circuitry operating to rotate the transmission of a control channel belonging to a serving time group over odd timeslot numbers in a repeating sequence given as 7, 5, 3, 1, 7, 5, . . . , where the rotation occurs between two predetermined frame numbers (FNs), and where a mapping of the control channels on timeslot numbers (TNs) is defined by:

$$\text{For } 0 \leqq FN \bmod 52 \leqq 3, TN=((6\times((FN\ div52) \bmod 4))+1+(2\times TG)) \bmod 8; \text{ and}$$

$$\text{For } 4 \leqq FN \bmod 52 \leqq 51, TN=((6\times((FN\ div52) \bmod 4))+7+(2\times TG)) \bmod 8,$$

where TG is a time group value.

13. A mobile station for use in a wireless TDMA communications system, comprising circuitry to receive information from a 52-multiframe, where frames comprise a plurality of sequentially numbered timeslots, said receive circuitry operating to synchronize to the rotation of the transmission of a control channel belonging to a serving time group over odd timeslot numbers in a repeating sequence given as 7, 5, 3, 1, 7, 5, . . . , where the rotation occurs within a frame between two predetermined frame numbers (FNs).

14. A mobile station for use in a wireless TDMA communications system, comprising circuitry to receive information from a 52-multiframe, where frames comprise a plurality of sequentially numbered timeslots, said receive circuitry operating to synchronize to the rotation of the transmission of a control channel belonging to a serving time group over odd timeslot numbers in a repeating sequence given as 7, 5, 3, 1, 7, 5, . . . , where the rotation occurs between two predetermined frame numbers (FNs), where a mapping of the control channels on timeslot numbers (TNs) is defined by:

$$\text{For } 0 \leqq FN \bmod 52 \leqq 3, TN=((6\times((FN\ div52) \bmod 4))+1+(2\times TG)) \bmod 8; \text{ and}$$

$$\text{For } 4 \leqq FN \bmod 52 \leqq 51, TN=((6\times((FN\ div52) \bmod 4))+7+(2\times TG)) \bmod 8,$$

where TG is a time group value.

15. A method comprising:

providing a plurality of 52-multiframes, each 52-multiframe containing 12 blocks of four consecutive frames, two idle frames, and two channels used for control channel purposes, said frames comprising a plurality of sequentially numbered timeslots, where each frame of a block corresponds to a serving time group; and rotating transmission of control channels belonging to a serving time group over non-sequential, alternate timeslot numbers within a frame that corresponds to the serving time group, wherein the rotation is performed so that at least one timeslot number used to transmit control channels in a frame corresponding to a given serving time group of a first 52-multiframe is different than at least one timeslot number used to transmit control channels in a frame corresponding to the given serving time group of a second 52-multiframe.

16. The method of claim 15, wherein:

the at least one timeslot number used to transmit control channels in the frame corresponding to the given serving time group of the first 52-multiframe comprises first and second timeslot numbers;

the at least one timeslot number used to transmit control channels in the frame corresponding to the given serving time group of the second 52-multiframe comprises second and third timeslot numbers; and wherein the rotation is performed so that a rotation occurs between the first and second timeslot numbers in the frame corresponding to the given serving group of the first 52-multiframe and between the second and third timeslot numbers in the frame corresponding to the given serving group of the second 52-multiframe.

17. The method of claim 15, wherein:

the at least one timeslot number used to transmit control channels in the frame corresponding to the given serving time group of the first 52-multiframe comprises a first timeslot number;

the at least one timeslot number used to transmit control channels in the frame corresponding to the given serving time group of the second 52-multiframe comprises a second timeslot number; and wherein the rotation is performed so that a rotation from the first and second timeslot numbers occurs between the first and second 52-multiframes.

* * * * *